United States Patent [19]

Berdinsky et al.

[11] Patent Number: 5,191,732
[45] Date of Patent: Mar. 9, 1993

[54] FISHING LIVE WELL COVER DEVICE

[76] Inventors: Marvin Berdinsky, 3820 Parapet Dr., Cocoa, Fla. 32926; Robert P. Smithwick, II, 250 Spruce Ave.; Michael J. Wilson, 235 Spruce Ave., both of Merritt Island, Fla. 32953; Charles J. Antetomaso, 585 Parkside Ave., Merritt Island, Fla. 32952

[21] Appl. No.: 726,890

[22] Filed: Jul. 8, 1991

[51] Int. Cl.⁵ .............................................. A01K 97/10
[52] U.S. Cl. ............................................................ 43/55
[58] Field of Search .......................................... 43/55, 56

[56] References Cited

U.S. PATENT DOCUMENTS

| | | | |
|---|---|---|---|
| 988,897 | 4/1911 | Raymond | 43/55 |
| 1,023,531 | 4/1912 | Shafer | 43/56 |
| 1,461,350 | 7/1923 | Friedrichs | 43/55 |
| 1,490,868 | 4/1924 | Voell | 43/55 |
| 1,698,018 | 1/1929 | Hendricks | 43/55 |
| 1,983,139 | 12/1934 | Lovell | 43/55 |
| 2,241,314 | 5/1941 | Mohler | 43/55 |
| 2,656,640 | 10/1953 | Johnson | 43/56 |
| 2,722,770 | 11/1955 | Giordano | 43/55 |
| 3,025,629 | 3/1962 | Sears | 43/55 |
| 5,038,515 | 8/1991 | Moorhead | 43/55 |

Primary Examiner—Kurt C. Rowan
Attorney, Agent, or Firm—Edward M. Livingston

[57] ABSTRACT

A device to cover live wells or other holding containers to retain fish and other aquatic animals. The cover has a plurality of flexible, resilient strap-like web members spaced apart in parallel and connected at at least two ends to a border. The cover may be attachable to the side of the container of a live well by various fastening means, such as hook and loop material, adhesive tape or hooks. One embodiment of the live well cover is provided with tubular members filled with foam so that it can float flush with the water in the live well, thereby requiring no attachment means to the live well whatsoever. This device prevents fish from escaping from a live well, yet allows them to be readily retrievable for weighing and cleaning.

9 Claims, 2 Drawing Sheets

FISHING LIVE WELL COVER DEVICE

BACKGROUND OF THE INVENTION

This invention relates to aquatic animal containing devices, and more particularly to a device for keeping and maintaining live fish in a receptacle, such as a live well in a boat.

In most cases, it is desirable to keep fish or other aquatic animals alive until one is ready to clean and dress said fish in order to prevent spoilage and maintain freshness of the fish. Moreover, in fishing tournaments, especially bass tournaments, it is required that fish be kept alive until weigh-in and returned to the originating water body. Sometimes, a pail, cooler or other container is used to retain fish or aquatic animals. However, most fishing boats contain a built-in live well in which the fish are maintained. Unfortunately for fishermen, aquatic animals and fish, especially bass, possess amazing leaping abilities and can leap out of a live well or other container if it is not covered at all times. Moreover, even when uncovered for a brief moment to retrieve the fish for weighing, cleaning, or other reasons, fish can escape from a live well.

Thus, a significant need exists for a device that will keep the fish and other aquatic animals from escaping from a live well or other container and still allow the fisherman to retrieve the fish when and as desired Also, fish and aquatic animals often die if not maintained in water having a temperature similar to that from which they originated. When the live well is open, the fish are exposed to light, which causes the fish to become agitated. This invention diffuses the sunlight thereby decreasing the agitation of the fish. Therefore, there is also a need to have a device that would not only keep the fish from escaping but also keep fish from becoming agitated and possibly injuring themselves.

The prior art is devoid of any device similar to the present invention but does contain some covers for live bait receptacles and containers for maintaining fish. For example, U.S. Pat. No. 1,773,804 by Bergren, dated Aug. 26, 1930, teaches a pail for holding bait which has coiled springs across the pail to III, dated Feb. 5, 1995, shows a mesh bag for holding keep bait from escaping. U.S. Pat. No. 4,498,190, by Garlick, aquatic animals. U.S. Pat. No. 3,143,263 by Farmer, dated Aug. 4, 1964, teaches a receptacle for holding live bait, said receptacle having a cover that has resilient cross members with an opening down the middle so one can reach the bait by hand. U.S. Pat. No. 4,315,402, dated Apr. 25, 1967, by Scott et al. shows another live bait container having a rubber cover with a slit to grab the bait. U.S. Pat. No. 2,722,770, by Giordano, dated Nov. 8, 1955, shows a live bait floating pail with covers. U.S. Pat. No. 2,732,653 by McGee, dated Jan. 31, 1956 shows a flying live-bait container with a diaphragm cover having a slit therein for reaching bait. U.S. Pat. No. 3,559,329 by Chiu, dated Feb. 2, 1971, shows a fish-holding bag with a one-way entrance so fish cannot escape. Finally, U.S. Pat. No. 2,800,741 by Adams dated July 30, 1957, shows a bait box with a cover and opening therein.

None of the above prior art contains any device similar in structure or use to the present invention which solves the problems of maintaining fish and aquatic animals in a live well by keeping the fish from escaping and allowing the fish to be retrieved as desired.

SUMMARY OF THE INVENTION

The primary object of the present invention is to provide a device for keeping fish and other aquatic animals from escaping from live wells or other containers.

Another object of the present invention is to provide a device that helps maintain or lengthen the lives of fish or aquatic animals by decreasing their exposure to the sun.

A further object is to provide such a device that will fit various sizes of live wells and other containers.

An even further object of the present invention is to provide a device that has alternative attachment means selectively desired by the user.

Another object of the present invention is to provide such a device that is easy to install.

An additional object of the present invention is to provide such a device that is inexpensive.

The present invention fulfills the above and other objects by providing a device for covering a holding container or live well that has a plurality of parallel resilient members spread apart from each other having common connecting border means at each end of the members. The device has attachment means on the connecting border means which allows it to be attached to the side wall of the holding container or live well to attachment means also provided on the side wall of the holding container.

The resilient members may consist of elasticized cloth straps. The common connecting means at the ends of the parallel resilient members may be straps of cloth to which the resilient members are sewn or optionally, tubular members made of polyvinylchloride (PVC) which may be foam filled to float in the water in the holding container. The attachment means for connecting the device to the sides of the live well may be hook and loop fastening material such as Velcro which is attached to matching Velcro strips on the sides of the live well. Adhesive tape or strips may also be used to attach the device. Another attachment means may consist of hooks attached to the side of the live well onto which the device could be attached. Although the cover may have only one set of parallel resilient members, it could also be designed to have two sets of parallel resilient members, each set perpendicular to the other, or even diagonally, provided the resilient members are parallel to each other.

The above objects and details of the device will become readily apparent when described in conjunction with the preferred embodiments shown in the drawings.

BRIEF DESCRIPTION OF THE DRAWINGS

This invention is described by claims in relation to a description of the preferred embodiments illustrated in the following drawings in which:

DESCRIPTION OF THE PREFERRED EMBODIMENTS

Figure 1:
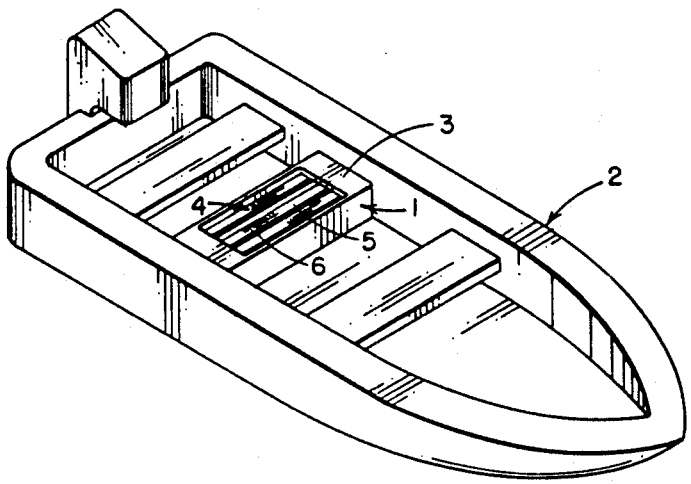
FIG. 1 is a perspective view of a live well showing the cover device in use on a boat.

Referring now to the drawings, in FIG. 1, a boat 2 is shown containing a built-in live well 1 showing the cover device 4, which is the subject of this invention, attached to the side walls 3 of the live well 1. The straps or webbing 5 are shown on top with spaces 6 between the webbing 5 for insertion of a hand for retrieving fish or other aquatic animals from the live well 1.

Figure 2:
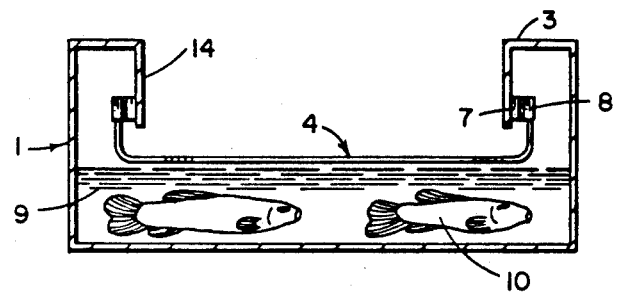
FIG. 2 is a side cross-section view of the cover device installed on a live well.

In FIG. 2, the cover device 4 is shown in side view as it might appear in the live well 1. The cover device 4 is attached at its border 8 by a fastening strip of material 7 secured to the insides 14 of the live well 1 These fastening strips 7 may be hook and loop fastening material such as Velcro glued or screwed to the underside of the live well 1 which attaches to matching fastening material 11 on the border. Preferably, the live well cover device 4 can be installed just above the water level 9 which contains the fish 10.

Figure 3:
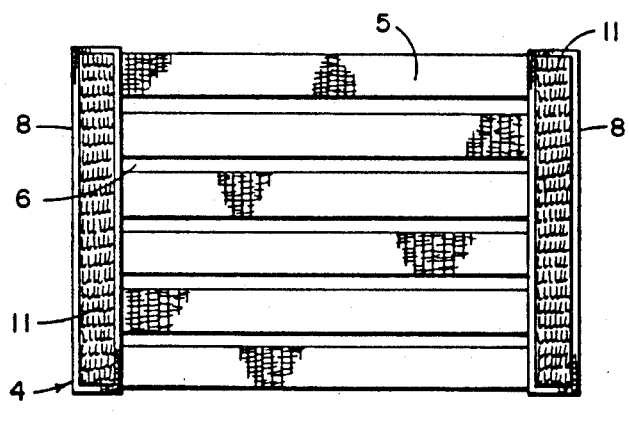
FIG. 3 is a top view of the cover device.
Figure 4:
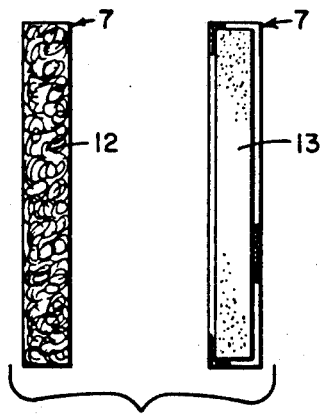
FIG. 4 is a direct view of the front and back of the fastening strip for the cover device.

An enlarged view of the live well cover device 4 is shown in more detail in FIG. 3. The top view of the live well cover 4 shows the strap-like webbing 5, which is preferably made of resilient elasticized material such as Banlon, such that it is flexible when a hand is inserted between the spaces 6 to retrieve fish. The strips of webbing 5 are secured to connecting side borders 8 that contain fastening material 11 on the tops thereof, which fastening material may comprise a strip of hook and loop fastening material such as Velcro sewn on the top thereof. The connecting side borders 8 themselves may be made of elastic nylon and would preferably consist of two bands to which the strips of webbing 5 are sandwiched between and sewn together. The set of attachment means 11 must secure to matching fastening means on the inside walls of the live well. In this embodiment, two fastening strips of material 7 are provided which contain fastening tape or glue 13 on the inside thereof, said straps 7 having fastening material 12 on the outside thereof to secure to the fastening material 11 on the connecting borders 8. Alternatively, the fastening strip 7 could be attached to the side of the live well by screws or snaps (not shown).

Figure 5:
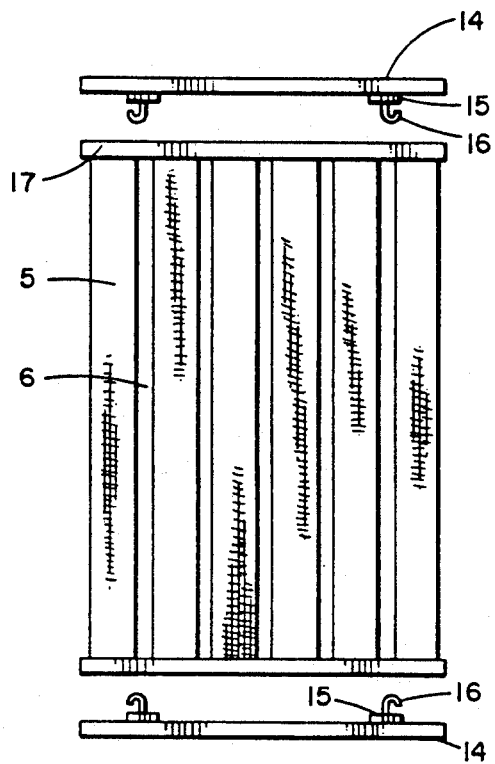
FIG. 5 is top view of a second embodiment of the cover device using hook fastening means.

Another embodiment of the cover is shown in FIG. 5. In this embodiment, the cover device 4 is similar to the previous embodiment in that it has plurality of parallel resilient elastic members 5 with spaces 6 in-between, the ends of said members 5 are attached to a rigid border frame 17. This frame 17 may consist of wood or plastic and may even be attached by hooks 16 attached to live well walls 14 of the live well 1 by an attachable mount 15 which is glued or screwed into the side walls 14.

Figure 6:
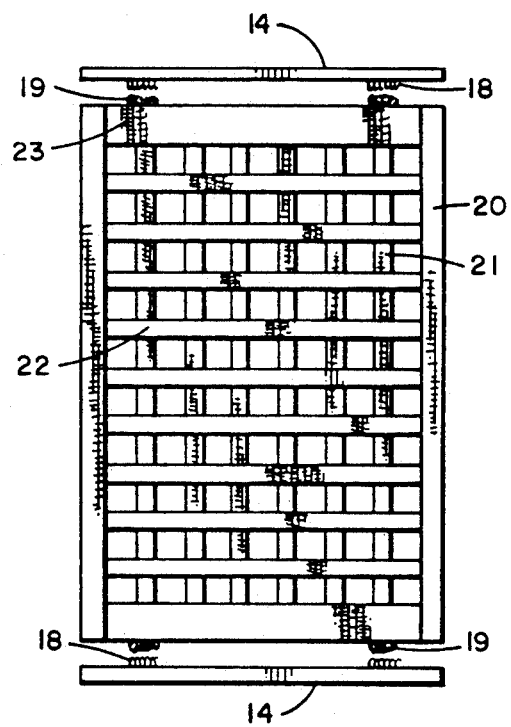
FIG. 6 is a top view of a third embodiment of the cover device with cross-webbing.

Referring to FIG. 6, another embodiment showing a cover device with cross-webbing is illustrated. This embodiment of the cover contains two sets of webbing, each set perpendicular to the other consisting of a plurality of vertical webbing 21 and a plurality of horizontal webbing 22. The horizontal webbing 22 would be attached to side borders 20. The vertical webbing straps 21 are attached to the end borders 23, which contain strips of fastening material 19 and are in turn secured to matching strips or fastening tabs 18 on the side walls 14 of the live well 1.

Figure 7:
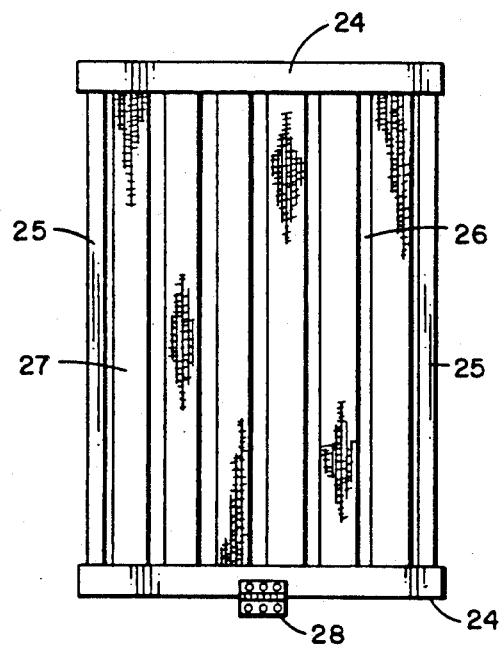
FIG. 7 is a top view of a fourth embodiment of the cover device using tubular members for floating capability without any attachment means.

In FIG. 7 an embodiment of the live well cover is shown which does not require attachment to the side walls 14 of the live well or other holding container. As shown, this embodiment contains a plurality of webbing 27 with spaces 26 in-between and is attached at two ends to tubular member 24, preferably consisting of foam-filled polyvinylchloride (PVC). To provide for additional flotation, on each end of the webbing 27 are thinner PVC tubes 25 which connect to the foam-filled PVC tubes 24 on each side thereof. This embodiment of the live well cover would lie almost flush on top of the water and require no attachments. This embodiment may also contain a hinge 28, which is attachable to one side of a live well wall such that the cover device could be completely pulled open and then returned to lie on the water of the live well.

Although the drawings show a rectangular-shaped cover device, almost any geometry necessary to fit the holding container, whether it be rectangular, circular or whatever shape necessary may be used.

As illustrated, the present cover device offers numerous advantages, the most important of which is that it prevents fish and other aquatic animals from escaping from holding containers. This live well cover could be made in various sizes and shapes to fit various sizes of live wells by the use of elasticized webbing which could stretch to fit a wide range of holding containers. As disclosed, this live well cover could be attached to the side of a live well or made to just float on top of the water without requiring any affixation to the sides of the live well.

Although several preferred embodiments of the invention have been discussed hereinabove, modifications and improvements thereto are included in the scope or equivalent of the claims.

List of Components

For convenience of the Examiner 1. live well
2. boat
3. sides of live well
4. cover device (the invention)
5. webbing
6. space between webbing
7. inside fastening strip of material for well wall
8. connecting border of cover
9. water level
10. fish
11. fastening material (e.g. Velcro)
12. outside of fastening strip material to 11 (e.g. Velcro)
13. fastening tape or glue on inside of 7
14. sides of live well
15. attachable mount
16. hooks
17. rigid border frame of cover device
18. fastening tabs
19. fastener on cover
20. side borders of cover
21. vertical cross webbing
22. horizontal cross webbing
23. end borders of cover
24. foam-filled PVC
25. side PVC
26. open space between webbing
27. webbing
28. hinge

Having thus described my invention, I claim:
1. A device for covering a holding container for fish and aquatic animals comprising:

a plurality of parallel single-layer resilient web-like members spaced apart from each other;

a common connecting border means for said resilient members at each end; and attachment means on the common connecting border means and matching attachment means on the side wall of the holding container for attaching the common connecting border means to the holding container wherein the attachment means comprises hook and loop fastening material attached to one side of the common connecting border means and matching fastening means on the walls of the holding container.

2. The device of claim 1 wherein the resilient members consist of elasticized cloth straps.

3. The device of claim 1 or 2 wherein the common connecting border means consists of two strips of material between which the resilient members are sewn.

4. The device of claim 1 or 2 wherein the common connecting border means comprises a rigid member.

5. A device for covering a holding container for fish and aquatic animals comprising:

a first plurality of parallel single-layer resilient web-like members spaced apart from each other;

a second plurality of parallel single-layer resilient web-like members spaced apart from each other and perpendicular to the first plurality of resilient members;

a common connecting border means for each plurality of resilient members, each of said common connecting border means being attached to the other; and attachment means on at least two connecting border means and matching attachment means on at least two side walls of the holding container wherein the attachment means comprises hook and loop fastening material attached to one side of the common connecting border means and matching fastening means on the wall of the holding container.

6. The device of claim 5 in which the resilient members consist of elastize cloth strips.

7. The device of claim 5 or 6 wherein the common connecting boarder means consists of two strips of material between which the resilient members are sewn.

8. The device of claim 5 or 6 wherein the common connecting boarder means is a rigid member to which the resilient members are attached.

9. A device for covering a holding container for fish and aquatic animals comprising:

a first plurality of parallel single-layer resilient web-like members spaced apart from each other;

a second plurality of parallel single-layer resilient web-like members spaced apart from each other and perpendicular to the first plurality of resilient members; and a common connecting border means for each plurality of resilient members, each of said common connecting boarder means being attached to the other wherein the connecting border means comprise tubular members made of polyvinylchloride (PVC) wherein the tubular members are filled with foam to increase the buoyancy of the live well cover on water contained in the holding container.

* * * * *